(12) United States Patent
Cohen

(10) Patent No.: US 10,214,903 B2
(45) Date of Patent: Feb. 26, 2019

(54) PANEL SYSTEM FOR BUILDING STRUCTURES

(71) Applicant: Adam Cohen, Roanoke, VA (US)

(72) Inventor: Adam Cohen, Roanoke, VA (US)

(*) Notice: Subject to any disclaimer, the term of this patent is extended or adjusted under 35 U.S.C. 154(b) by 851 days.

(21) Appl. No.: 14/680,379

(22) Filed: Apr. 7, 2015

(65) Prior Publication Data

US 2015/0284954 A1 Oct. 8, 2015

Related U.S. Application Data

(60) Provisional application No. 61/976,326, filed on Apr. 7, 2014, provisional application No. 62/099,337, filed on Jan. 2, 2015.

(51) Int. Cl.
| | |
|---|---|
| *E04C 2/296* | (2006.01) |
| *E02D 27/01* | (2006.01) |
| *F16M 13/02* | (2006.01) |
| *G06Q 30/06* | (2012.01) |
| *G06Q 10/08* | (2012.01) |
| *E04B 1/70* | (2006.01) |

(52) U.S. Cl.
CPC .............. *E04C 2/296* (2013.01); *E02D 27/01* (2013.01); *F16M 13/02* (2013.01); *G06Q 10/083* (2013.01); *G06Q 30/0635* (2013.01); *Y10T 29/49629* (2015.01)

(58) Field of Classification Search
USPC ....................................................... 705/26.81
See application file for complete search history.

(56) References Cited

U.S. PATENT DOCUMENTS

| | | | | |
|---|---|---|---|---|
| 4,224,773 A | * | 9/1980 | Schworer | B32B 13/12 52/309.8 |
| 2014/0083040 A1 | * | 3/2014 | Taylor, Jr. | E04C 2/04 52/513 |
| 2015/0284954 A1 | * | 10/2015 | Cohen | G06Q 30/0635 705/26.81 |
| 2015/0292770 A1 | * | 10/2015 | Tandler | F24D 3/005 126/618 |
| 2017/0175388 A1 | * | 6/2017 | Siver | E04B 2/08 |

OTHER PUBLICATIONS

Product listing by Passiv Structures, showing construction system used to construct a residence more than one year prior to priority date of present application.
Ernst, Daniel. "Tight House, Tight Budget." Energy-Smart Homes (2014): 19-23. www.finehomebuilding.com, showing construction system used to construct a residence more than one year prior to priority date of present application.
Photos of system for installing windows in use more than one year prior to priority date of present application.

* cited by examiner

*Primary Examiner* — Garcia Ade
(74) *Attorney, Agent, or Firm* — Erickson Kernell IP, LLC; Kent R. Erickson

(57) ABSTRACT

Prefabricated exterior panels and slab foundation systems are disclosed for use in an integrated simple design procedure for use in low-energy use buildings. The panels include a frame formed from conventional framing methods, an inner layer of sheathing fastened to an outer side of the frame, a layer of insulation adhered to an outer surface of the inner layer of sheathing without using fasteners, and an outer layer of sheathing adhered to an outer surface said layer of insulation without using fasteners. Sets of panels are formed with openings for windows or doors. Jigs are used for constructing the panels including corner panels.

9 Claims, 18 Drawing Sheets

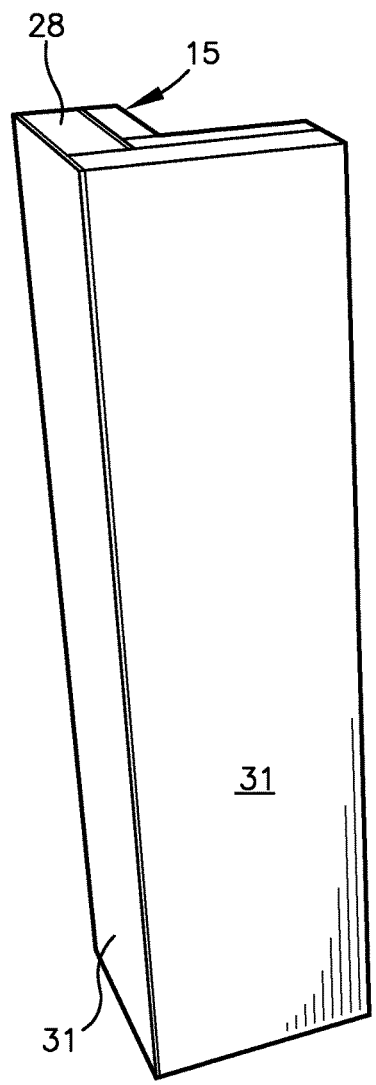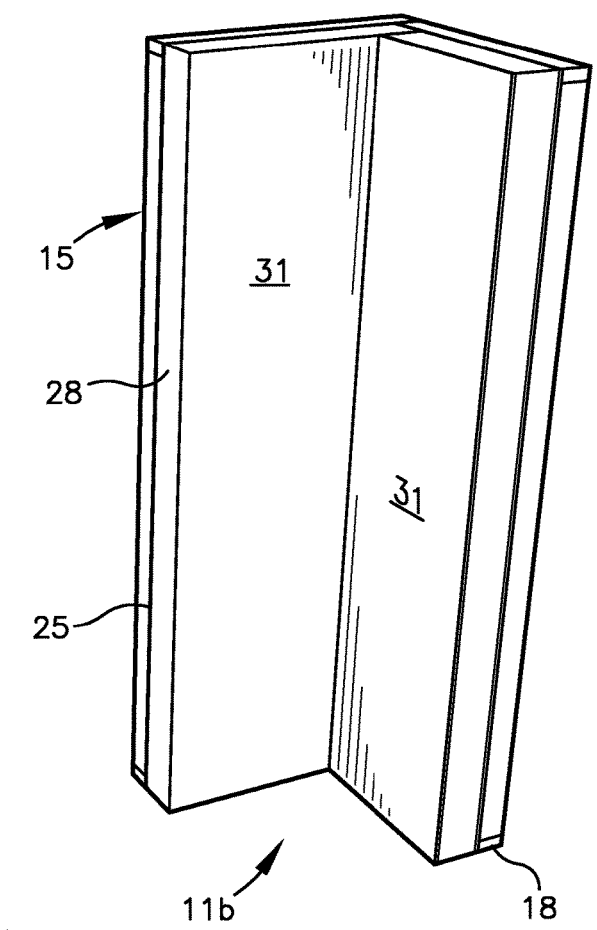
Fig. 7
Fig. 9

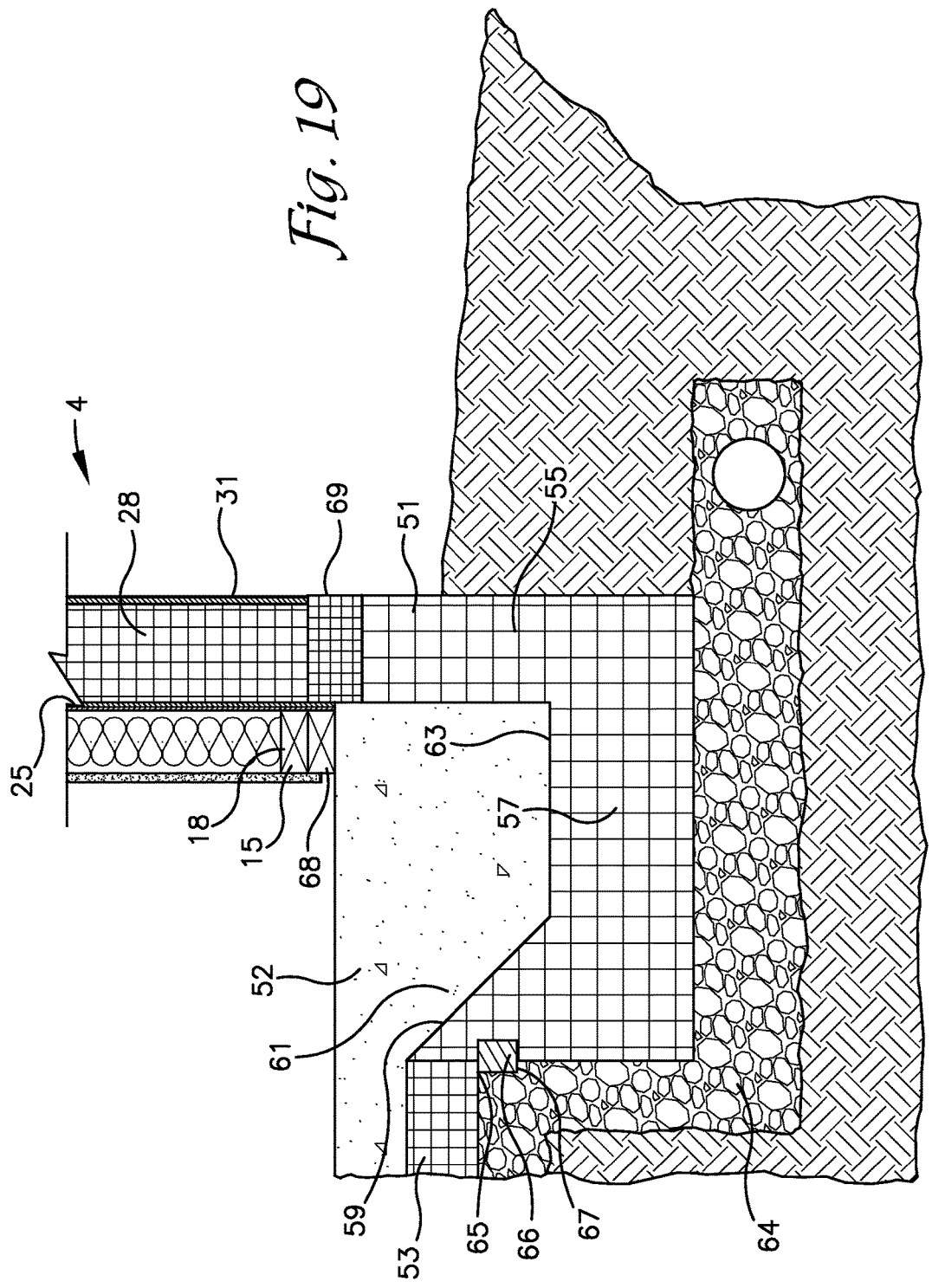

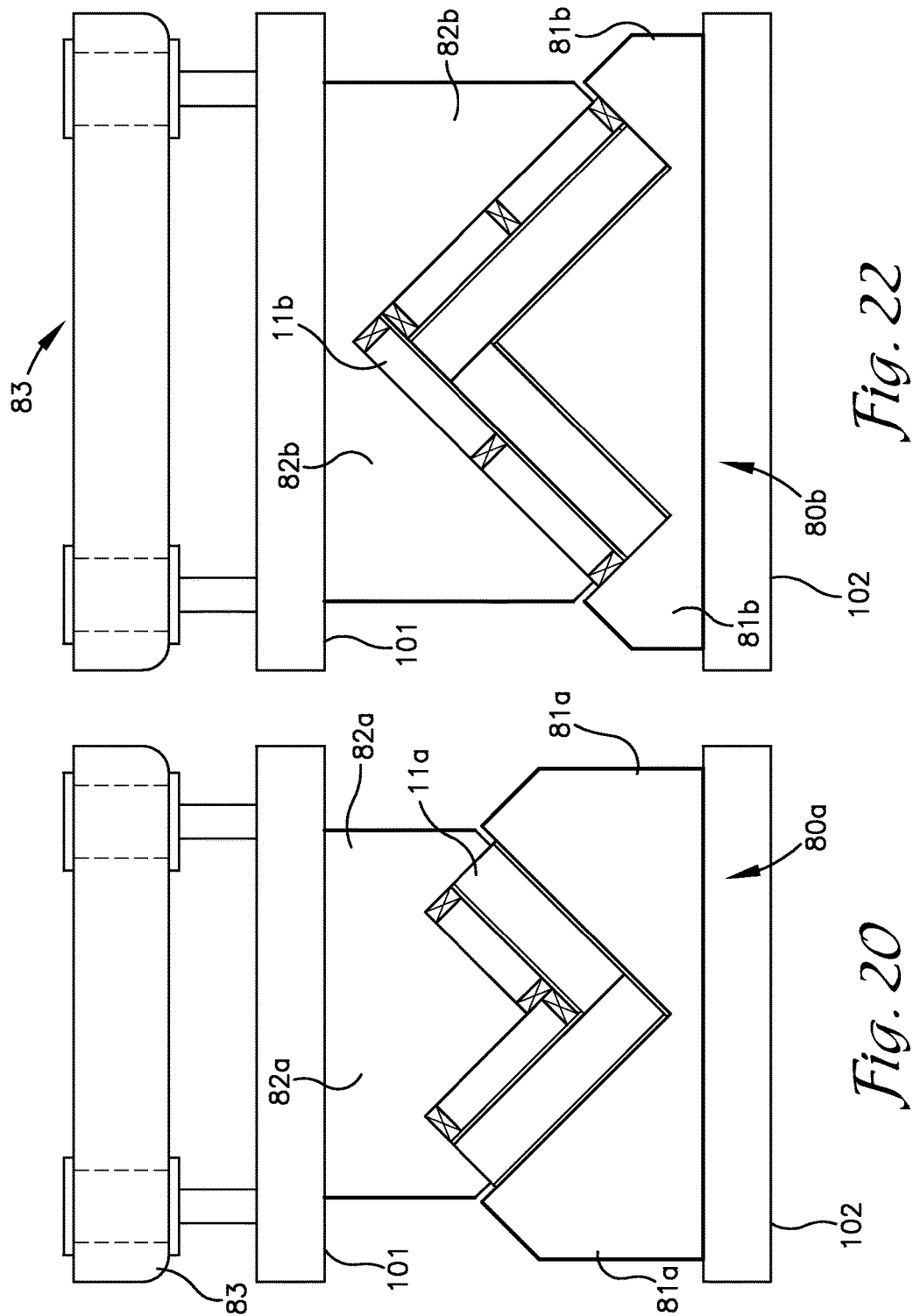

PANEL SYSTEM FOR BUILDING STRUCTURES

CROSS-REFERENCE TO RELATED APPLICATIONS

This application claims the benefit of U.S. Provisional Patent Application No. 61/976,326 filed Apr. 7, 2014; and U.S. Provisional Patent Application No. 62/099,337 filed Jan. 2, 2015, the disclosures of which are hereby incorporated herein in their entirety by reference.

FIELD OF THE INVENTION

The present invention is directed to a panel system for building structures and in particular insulated panels for reducing energy consumption in buildings.

BACKGROUND OF THE INVENTION

The immediate problem of climate change effects on future generations make low carbon solutions today an imperative. In the United States approximately 40% of greenhouse gas (GHG) pollutants are associated with our buildings, with 93% of these GHGs being created through the lifetime operations of the building through energy use intensity. With such a large percentage of GHG created through our buildings combined with the fact that it is not atypical for a building to have life expectancy of 100 years or more it follows that the creation of net zero low energy buildings is a necessity now. We have the knowledge and experience to create buildings today that use 70% less energy than current code requires, prior to any site generation being added. The problem today is that in the absence of the legislative will to mandate this change, market rate solutions are the only viable way to deliver these buildings today. The inventions described here represent this market-rate solution.

Previous attempts at making such market rate solutions have suffered from several problems including:
  lacking affordability;
  boutique status because the products are too foreign for most builders and consumers to adopt in a wide manner;
  lack of a comprehensive systematized methodology of design, testing and performance;
  lack of a simple strategy that mitigates thermal bridges, creates an air tight envelope; and uses high performance transparent components;
  lack of building physics support of low energy strategies; and
  simplicity of design, installation and use.

SUMMARY OF THE INVENTION

This disclosure describes prefabricated exterior panels, slab foundation systems and an integrated simple design procedure for use in low-energy use buildings, methods for joining the panels to form airtight seams, and methods and apparatus for manufacturing the panels. The assembled panels present airtight seals and also eliminate thermal bridging.

BRIEF DESCRIPTION OF THE DRAWINGS

FIG. 7 is a front perspective view of an outer corner panel of the modular wall panel system.

FIG. 8 is a rear perspective view of the outer corner panel as shown in FIG. 7.

FIG. 9 is a front perspective view of an inner corner panel of the modular wall panel system.

FIG. 19 is a schematic cross-sectional view showing a panel mounted on a slab formed using a J-shaped insulating from.

FIG. 20 is a diagrammatic view of a jig used to form and secure together components of an outer corner panel of the modular wall panel system which is positioned within a press.

FIG. 22 is a diagrammatic view of a jig used to form and secure together components of an inner corner panel of the modular wall panel system which is positioned within a press.

DETAILED DESCRIPTION OF THE PREFERRED EMBODIMENTS

Figure 1:
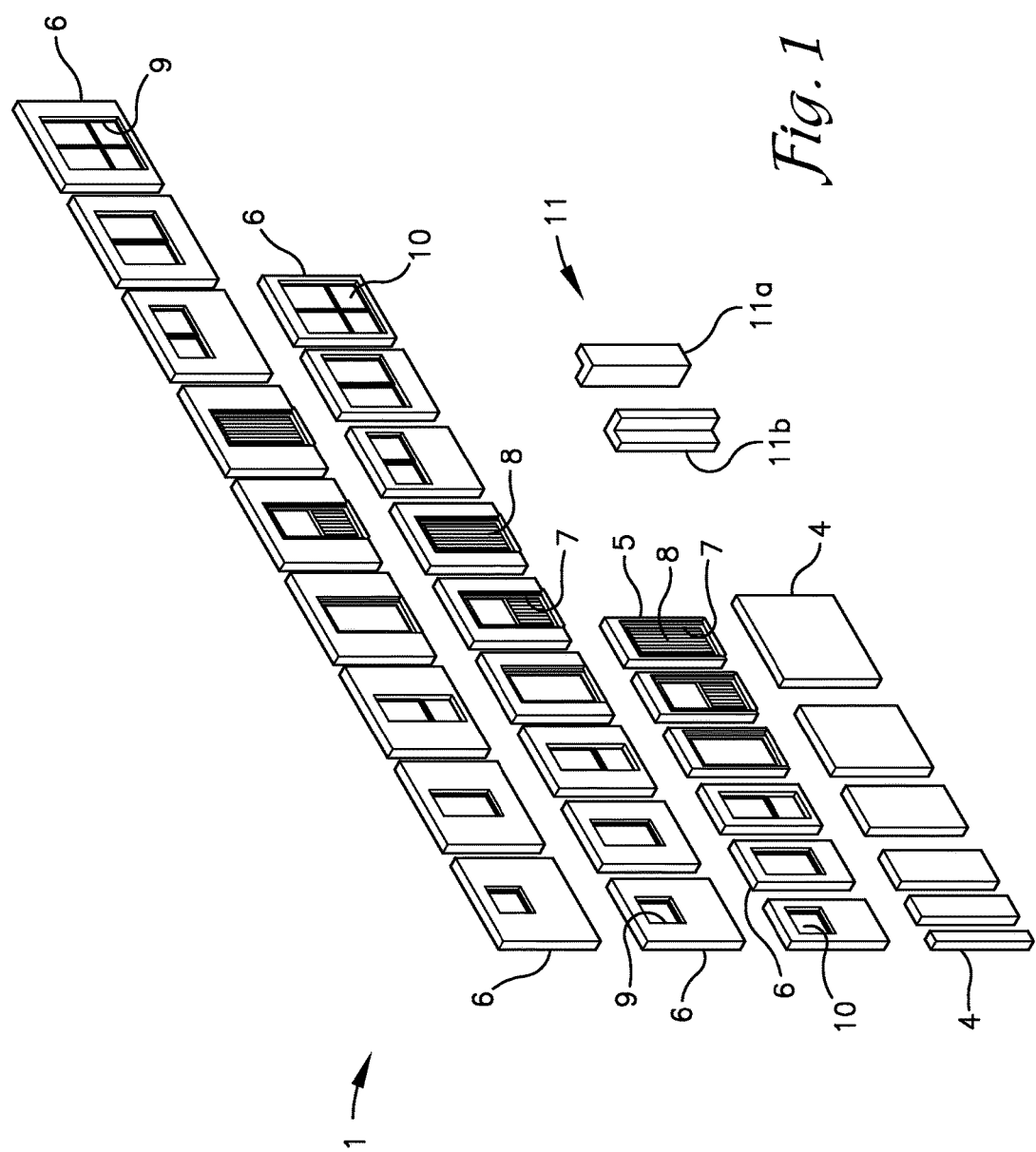
FIG. 1 is a diagrammatic view of a variety of panels forming a modular wall panel system.
Figure 2:
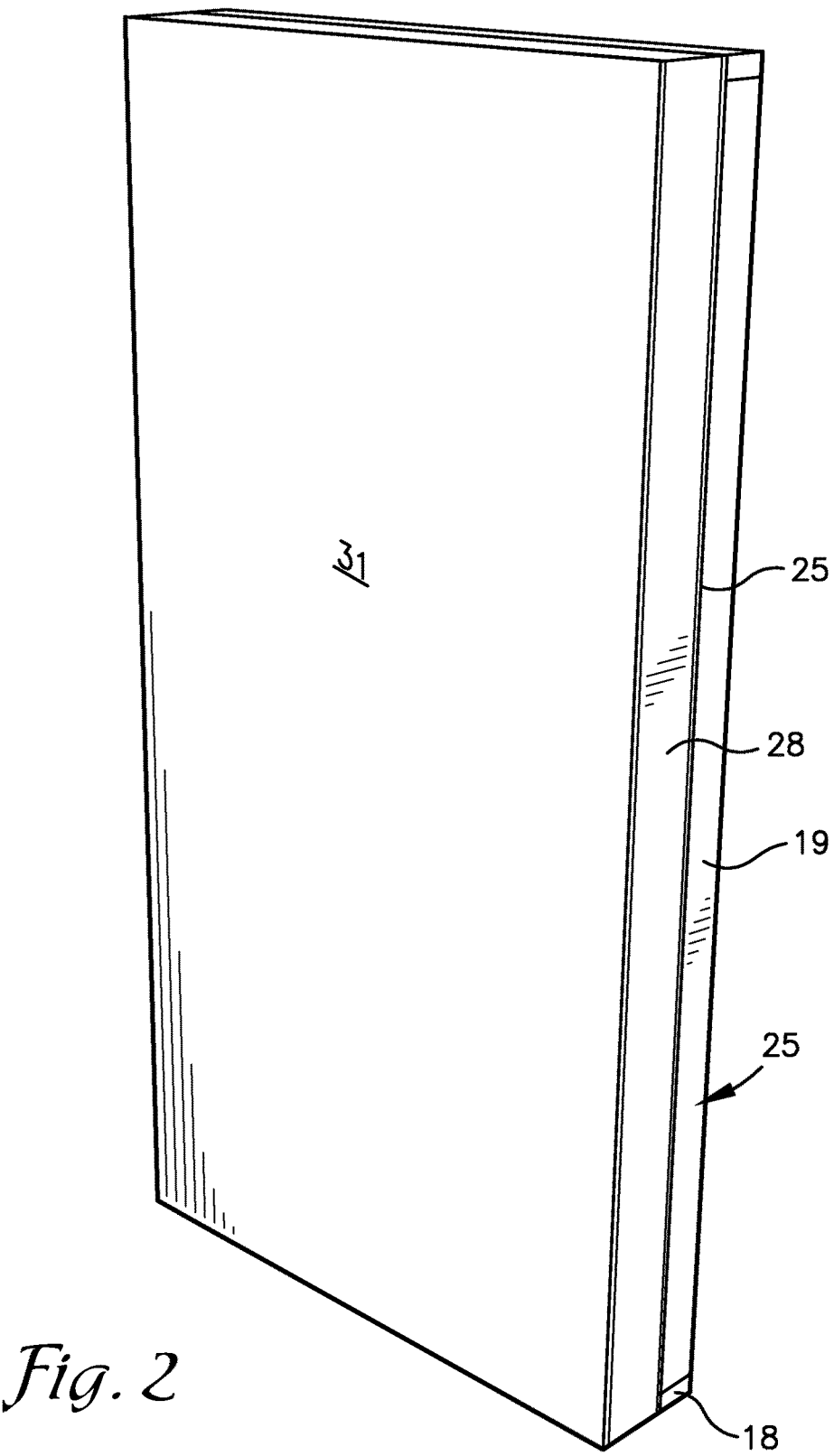
FIG. 2 is a front perspective view of a continuous panel of the modular wall panel system.
Figure 3:
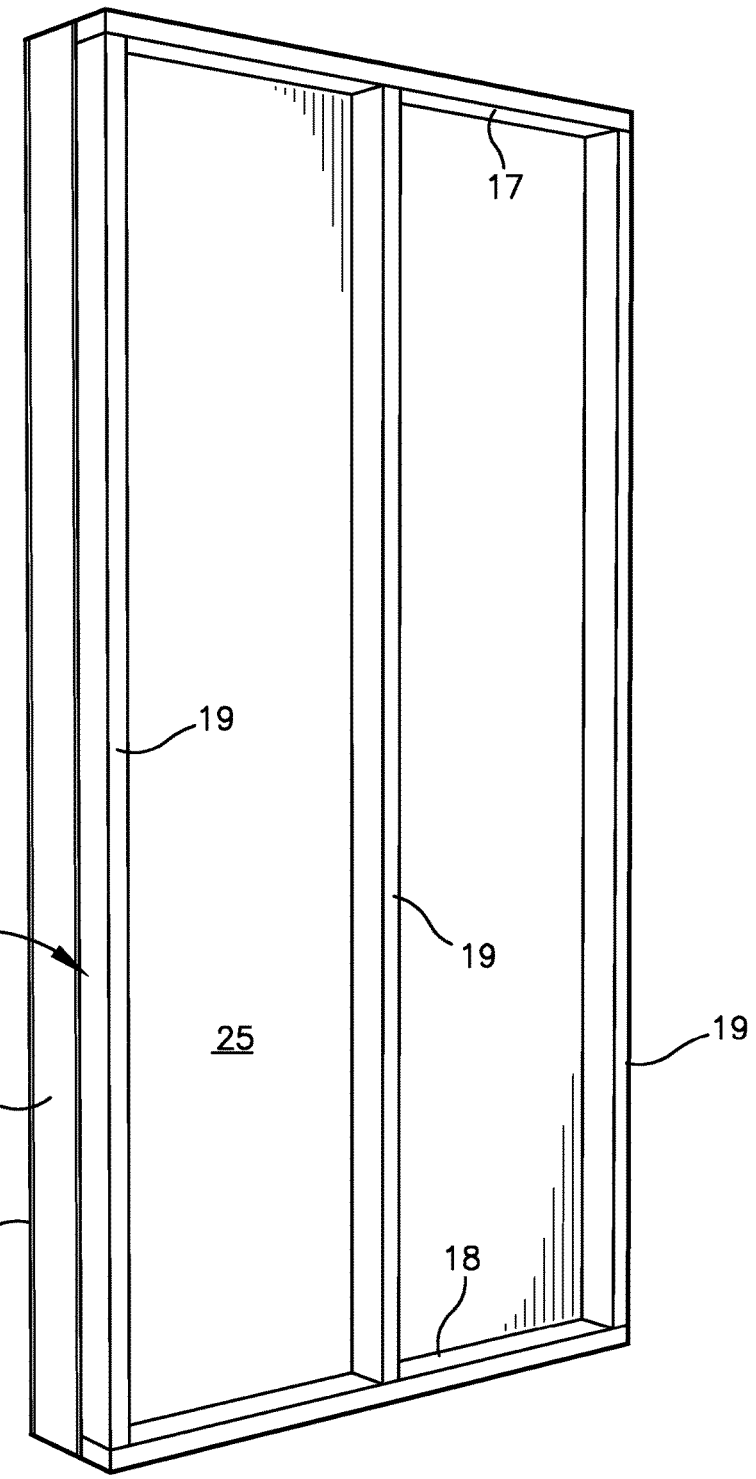
FIG. 3 is a rear perspective view of the continuous panel shown in FIG. 2
Figure 4:
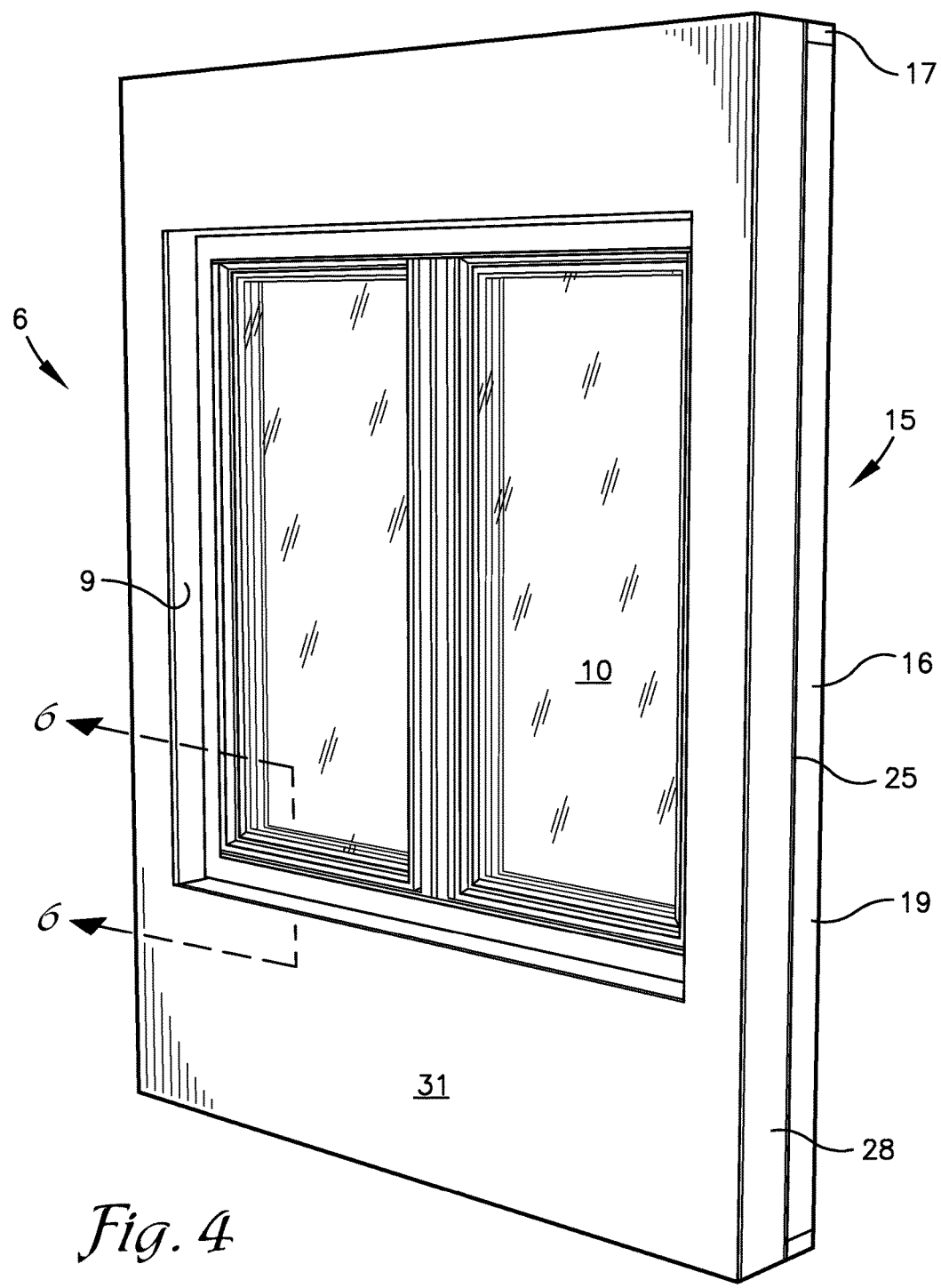
FIG. 4 is a front perspective view of a window panel of the modular wall panel system having a window mounted in an opening through the panel.
Figure 5:
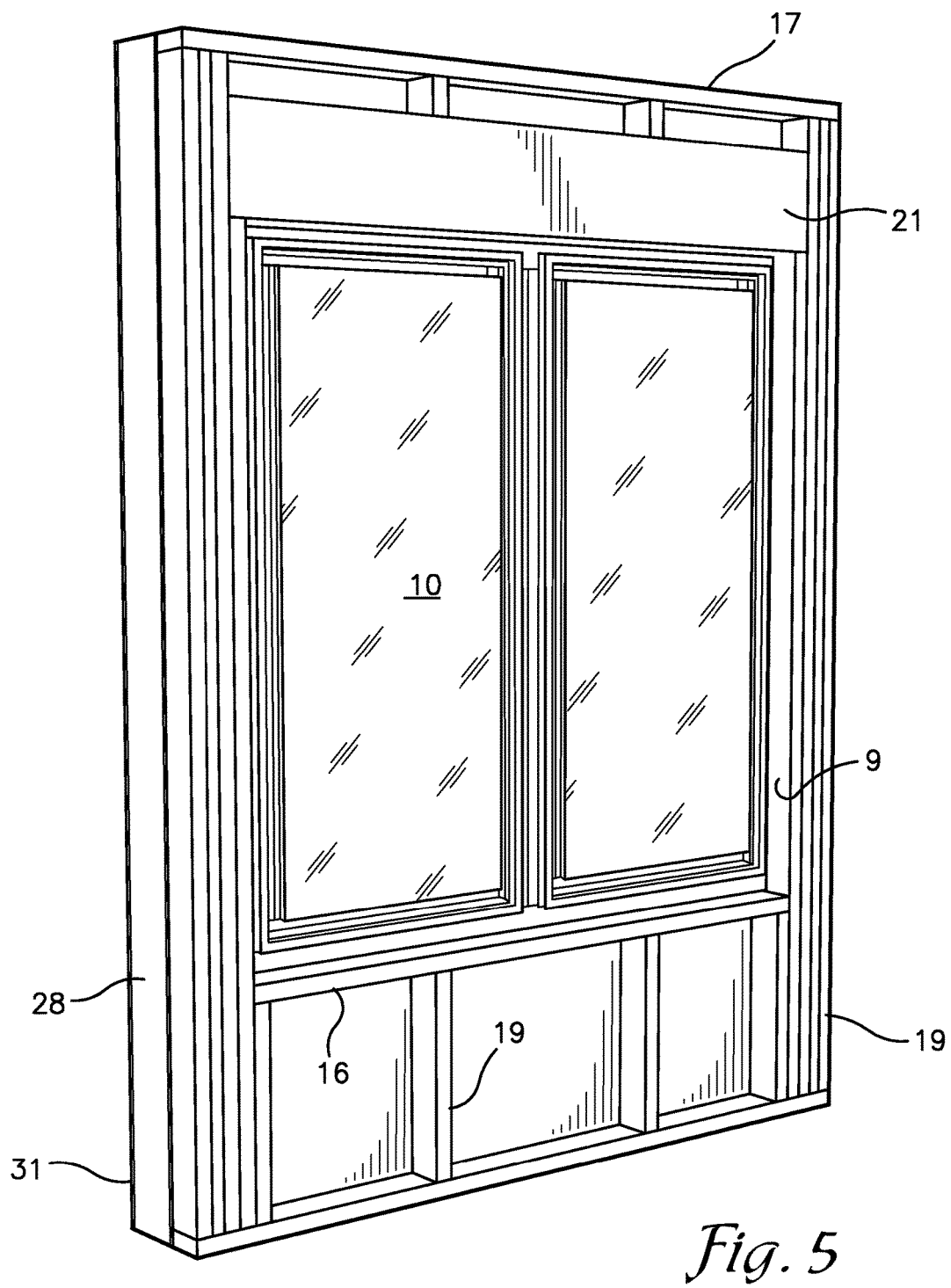
FIG. 5 is a rear perspective view of the window panel as shown in FIG. 4.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from respectively, the geometric center of the embodiment being described and designated parts thereof. Said terminology will include the words specifically mentioned, derivatives thereof and words of a similar import.

Referring to the drawings in more detail, a modular, insulated wall panel system 1 is shown which can be used in the construction of buildings including habitable structures. The wall panel system 1 includes a plurality of types of panels of varying widths and configuration which can be assembled together by a builder to construct a wide variety of straight walled buildings. The panel system 1 includes a set of continuous panels 4 of a standard height and varying widths, including for example, widths of one, two, three, four, six and eight feet wide.

The panel system also includes a set of door panels 5 and window panels 6. Door panels 5 include openings 7 in which a door 8 may be hung and window panels 6 include an opening 9 in which windows 10 may be installed. Doors 8 and windows 10 are preferably centered from side to side in the panel 5 or 6 in which they are installed. Doors 8 may be installed in door panels 5 four feet or greater in width including six and eight feet. Single windows 10 may be installed in window panels 6 four feet or greater in width including six or eight feet. Double windows 10 may be installed in window panels 6 six foot or greater in width including eight feet. The door panels 5 and window panels 6 may also be referred to as discontinuous panels in that they do not present a continuous exterior surface but have openings formed therein to receive doors 8 and windows 10. It is to be understood that the width of the panels 4, 5 and 6 can be varied to accommodate regional or jurisdictional preferences related to stud spacing or metric versus English measurements.

The panel system 1 also includes a plurality of corner panels 11 for use in forming corners of the building including outside corner panels 11a and inside corner panels 11b. The outside corner panels 11a are used to construct outside corners of a building where two walls come together to form an external angle, as in a corner one can walk around. The inside corner panels 11b are used to construct inside corners of a building where two walls form an internal angle.

Door panels 5, window panels 6 and corner panels 11 also are preferably constructed to a standard height. The standard height of panels 4, 5, 6 and 11 may be, for example, eight or nine feet or taller depending on the intended use.

Figure 6:
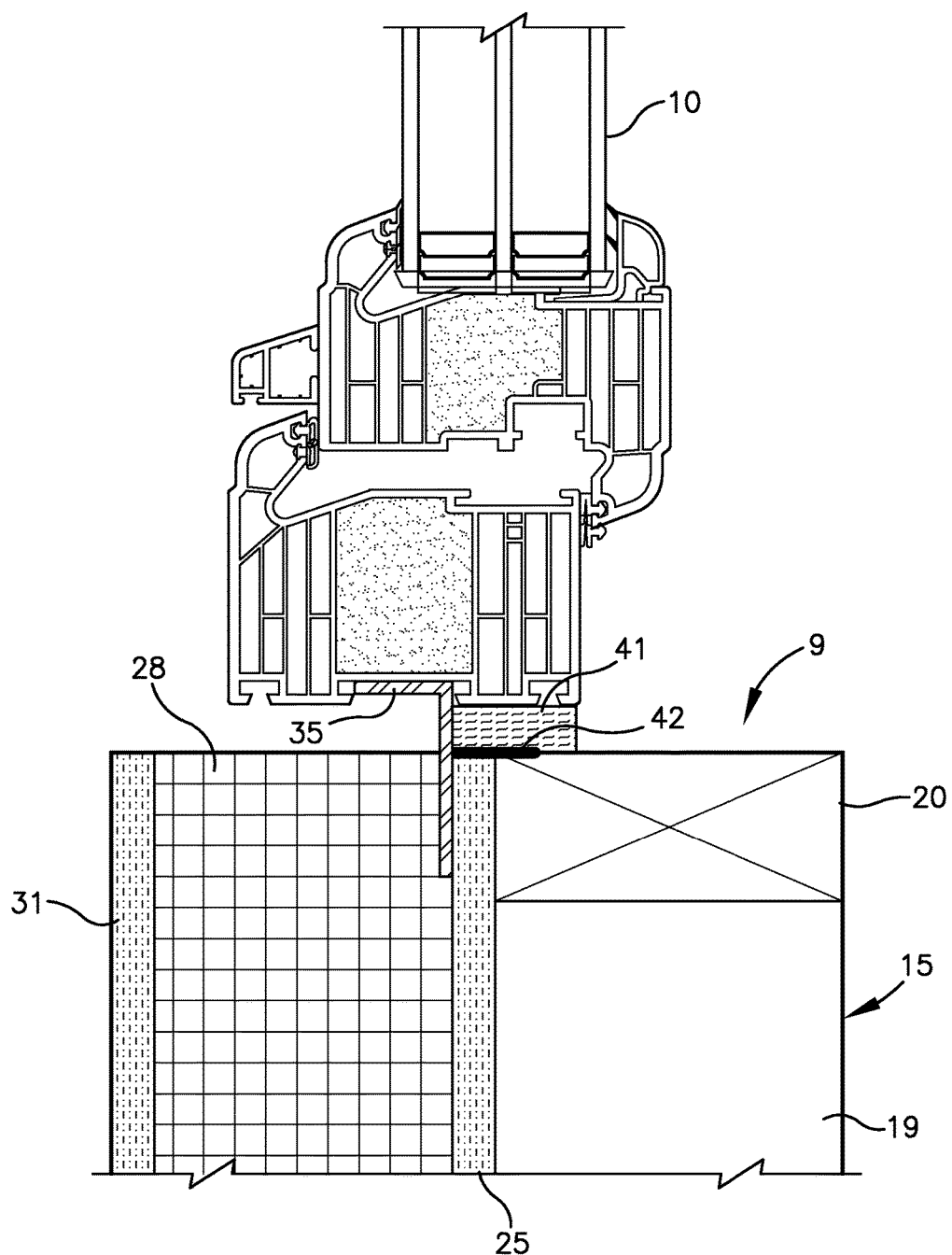
FIG. 6 is an enlarged scale and fragmentary cross-sectional view of the window panel and window taken along line 6-6 of FIG. 4.
Figure 10:
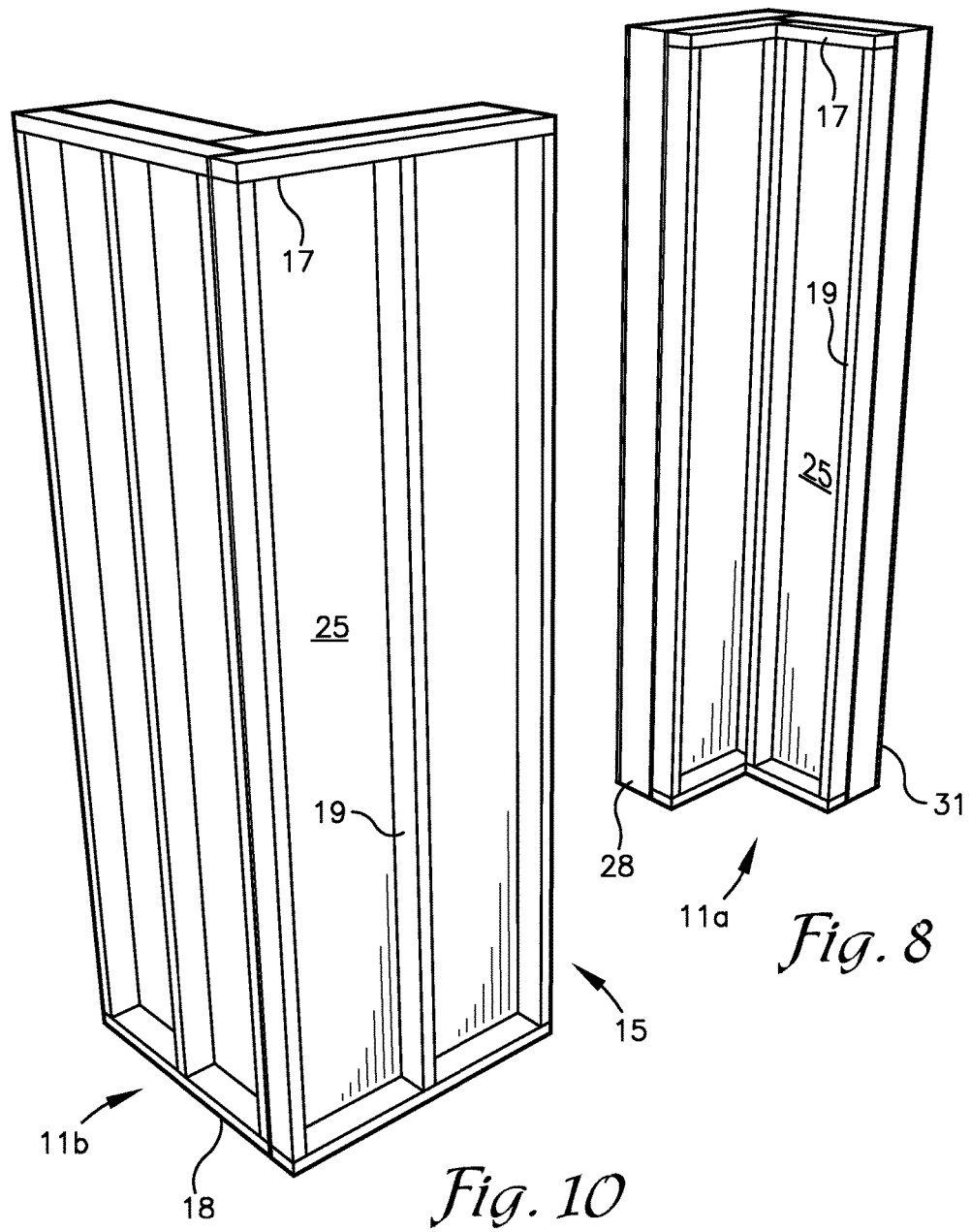
FIG. 10 is a rear perspective view of the inner corner panel as shown in FIG. 9.
Figure 11:
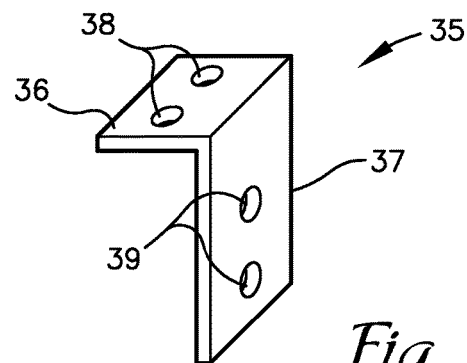
FIG. 11 is a perspective view of an L-shaped clip for connecting a window or door frame to a window or door panel.
Figure 14:
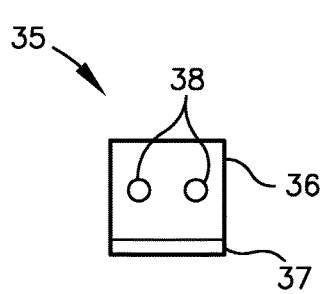
FIG. 14 is a bottom view of the clip as shown in FIG. 11.
Figure 13:
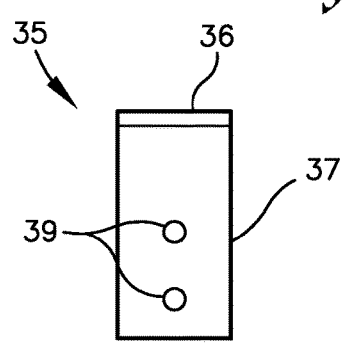
FIG. 13 is a rear elevational view of the clip as shown in FIG. 11.
Figure 12:
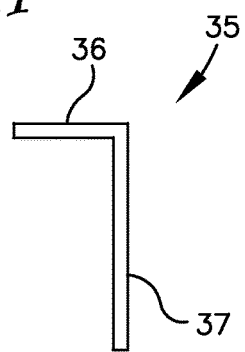
FIG. 12 is a left side elevation view of the clip shown in FIG. 11.
Figure 15:
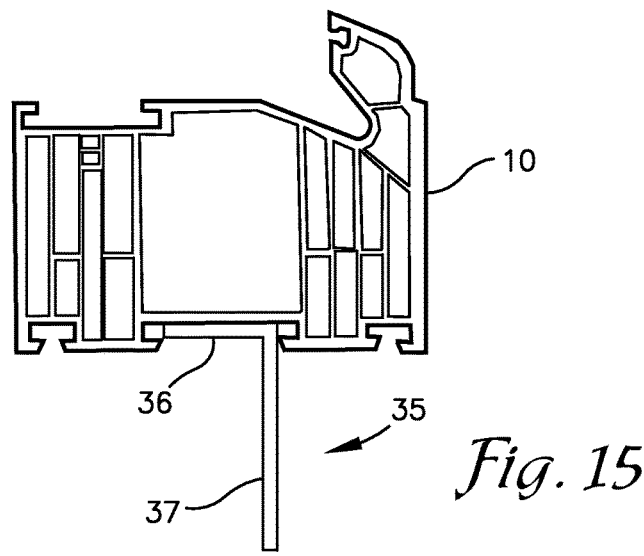
FIG. 15 is a cross-sectional view similar to FIG. 6, showing the clip connected to a frame of a window.

The construction of each of each of the panels 5, 7 and 11 is similar and exemplary embodiments are shown in FIGS. 2 through 10. FIG. 6 is a fragmentary cross sectional view of a window panel 6 with a window 10 supported in the opening 9 formed therein. Window panel 6 includes a structural frame 15 preferably formed using conventional framing members 16 which may be formed of wood, steel or other suitable construction materials including composite or engineered framing members. Framing members 16 of standard dimensions, including 2×4 or 2×6 are preferably used depending on regional preferences or factors such as the preferred depth of insulation to be installed between the framing members 16.

The structural frames 15 are preferably constructed using conventional stick and frame construction techniques and practices for forming walls for buildings and in a preferred embodiment are constructed as rectangular frames. Each structural frame 15 preferably includes a top plate 17, a sill or bottom plate 18 and a plurality of studs 19 extending between the top plate 17 and bottom plate 18. The number of studs 19 will depend on the width of the panel 4, 5, 6 or 11 and studs 19 may be spaced using a conventional spacing of sixteen inches from each other's center or with a spacing of twelve or twenty four inches. Conventional framing techniques are also preferably used for forming window sills 20 and 21 and for framing openings 7 and 9 for doors 8 for windows 10. The structural frames 15 may be secured together using conventional fasteners such as nails or screws or other fastener means including brackets with integrated spikes to connect two or more adjacent frame members together.

In one embodiment, an inner sheathing 25 is secured to and across the exterior surface of the structural frame 15 using fasteners such as nails or screw or other acceptable means such as adhesives. The sheathing 25 preferably extends the entire height of the frame 15. Holes are cut or otherwise formed in the sheathing 25 to match any openings formed in the structural frame 15 for windows 10 or doors 9. The inner sheathing 25 may be formed from oriented strand board or plywood or other engineered wood sheathing or other suitable sheathing material. Sheathing 25 may be formed from multiple sheets of material including a water impermeable layer applied as a sheet which is adhered to bonded to or mechanically fastened to an exterior surface of the engineered wood or as a liquid or spreadable type coating. The sealed sheathing 25 forms an airtight barrier. It is also to be understood that a layer of inner sheathing 25 formed from engineered wood or the like and without a waterproof layer applied to an exterior surface thereof may be attached to the frame 15.

A layer of insulation 28 is secured to an exterior surface of the inner sheathing 25 using a compatible adhesive or other acceptable means such as fasteners. However, in a preferred embodiment, the layer of insulation 28 is secured to an exterior surface of the inner sheathing with an adhesive and without the use of any fasteners such as nails or screws extending through the insulation which would form a thermal bridge therethrough. It is also foreseen that the insulation 28 could be secured directly to the structural frame 15 without inclusion of the inner sheathing 25 Holes are cut or otherwise formed in the layer of insulation 28 corresponding to any openings 7 and 9 formed in the structural frame 15 for windows 10 or doors 8. The insulation is preferably formed as rigid panels and may be a rigid foam type insulation including polystyrene or polyurethane foams. The rigid panels may also be formed from materials including mineral wool insulation, wood fiber, wheat straw, mycillium or foam glass or other insulating materials that are now known or later developed.

An exterior sheathing 31 is secured to and across the exterior surface of the insulating layer 28 using a compatible adhesive or other acceptable means including the use of fasteners. In a preferred embodiment, the exterior sheathing 31 is connected to the layer of insulation 28 using an adhesive and without the use of fasteners extending through the insulating layer 28 which would form a thermal bridge therethrough. The exterior sheathing 31 is preferably formed from a material into which nails can be driven such as oriented strand board or plywood. The insulating layer 28 and exterior sheathing 31 preferably are the same width as the structural frame 15 and may be sized the same height as the structural frame 15 or shorter with portions of the frame 15 and interior sheathing 25 extending above and/or below the insulating layer 28 and exterior sheathing 31. Exterior siding (not shown) or additional layers may then be secured to the exterior sheathing 31 using fasteners such as nails or screws. The exterior sheathing 31 may also be formed from a plurality of sheets of material including a water impermeable layer applied as a sheet which is adhered to, bonded to or mechanically fastened to an exterior surface of the engineered wood or as a liquid or spreadable type coating. The water impermeable layer may be applied to the exterior sheathing 31 in a factory in which the panels 4, 5, 6 and 11 are assembled or in the field.

As shown in FIG. 6, windows 10 may be secured in the openings 9 of window panels 6 using a plurality of fastening angle clips 35. Referring to FIGS. 12-15, each clip 35 includes first and second legs 37 extending in perpendicular relationship and with respective pairs of fastener holes 38 and 39 formed in each leg 36 and 37. Centers of the fastener holes 38 in the first leg 36 of each clip 35 are aligned on an axis extending parallel to a corner 40 formed between the first and second legs 36 and 37. Centers of the fastener holes 39 in the second leg 37 of each clip 35 are aligned on an axis extending transverse to the corner 40. It is also foreseen that centers of the fastener holes 38 in first leg 36 may extend in spaced relation across the width of the first leg 36 but not with the centers aligned in parallel relation to the corner 40. Similarly, the centers of the fastener holes 39 in the second leg may extend in spaced relation lengthwise relative to the second leg 37 without extending in alignment on an axis extending transverse to the corner 40.

The first leg 36 of each angle clip 35 is secured to an exterior surface of mounting structure of the window 10 using nails or screws (not shown) driven through fastener holes 38. The second leg 37 of each clip 35 projects radially outward from the window 10 and may be secured to the inner sheathing 25 around the opening 9 formed therein and secured in place using fasteners driven through fastener holes 39 formed in the second leg 37. The opening 9 is sized slightly larger than the window 10 so that a gap of approximately ½ inch or larger is formed between the first leg 36 of each clip and an inner surface of the portion of the inner sheathing 25 extending around the opening 9. The insulating layer 28 with a mating opening formed therein, may then be attached to the exterior surface of the inner sheathing 25 with a small gap, typically between ¼ to ¾ of an inch, formed between the first leg 36 and insulating layer 28 along the bottom of the window 10. In an exemplary embodiment, the first leg is 1 and ³¹⁄₃₂ inches long and the second leg is ³¹⁄₃₂ inches long with both legs formed from ⅛ inch thick sheet metal. Clips 35 may be formed of a variety of widths including ³¹⁄₃₂ inches wide.

A variety of sealants or sealing members may be applied or positioned in the gaps formed between the frame of the window 10 and the portion of the window panel 6 surrounding the opening 9. As shown in FIG. 6, a strip of expandable foam 41 and a layer of sealant 42 are shown positioned between the periphery of the window 10 and an inner edge of the frame 15 and inner sheathing 25 around the opening 9. A trim piece (not show) may be installed across the sill to cover the exterior gap between the bottom of widow 10 and the inner edge of the insulating layer 28 and exterior sheathing 31.

Frames for doors 8 may be secured in an opening 7 of a door panel 5 using angle clips 35 in a manner similar to that described with respect to securing windows 10 in an opening 9 in a window panel 6.

Panels 4, 5, 6 and 11 are adapted to be secured to a floor or sub floor by nailing or screwing the bottom plate 18 to the floor or a sill connected to the foundation. Additional stories and a roof may be added to the structure formed by panels 4, 5, 6, and 11 using conventional framing and flooring techniques.

Figure 16:
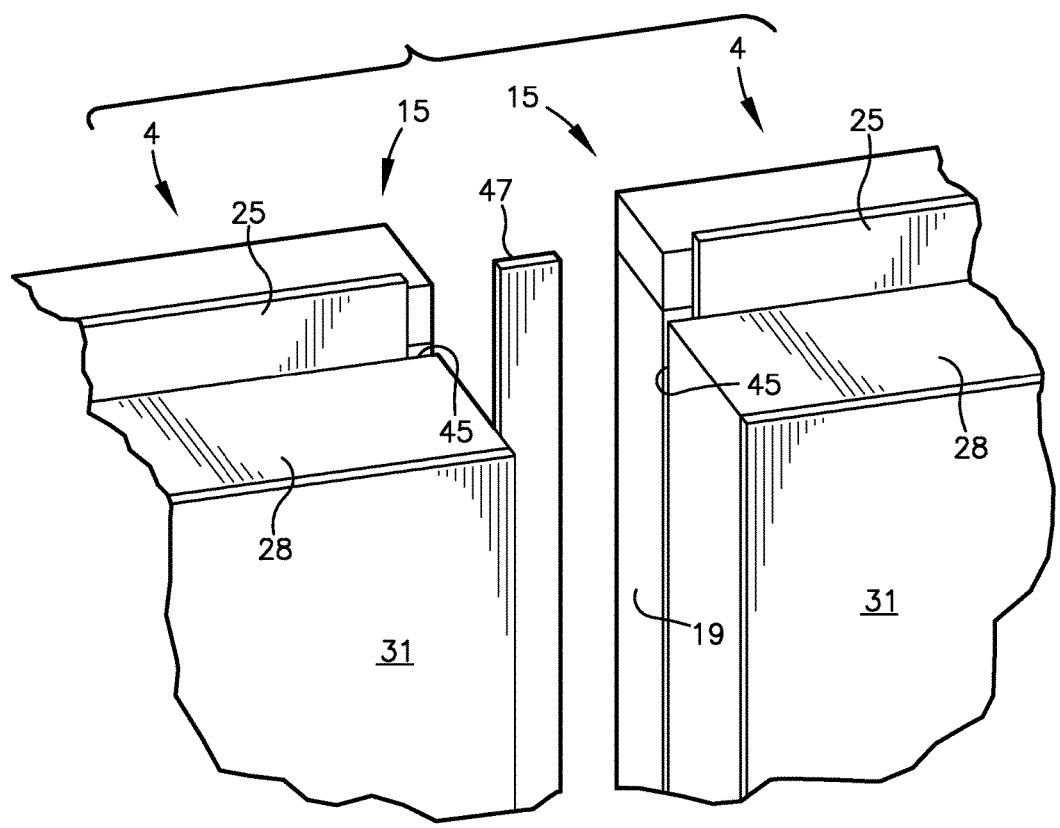
FIG. 16 is an enlarged and fragmentary exploded perspective view showing a joint between two panels of the modular wall panel system.
Figure 17:
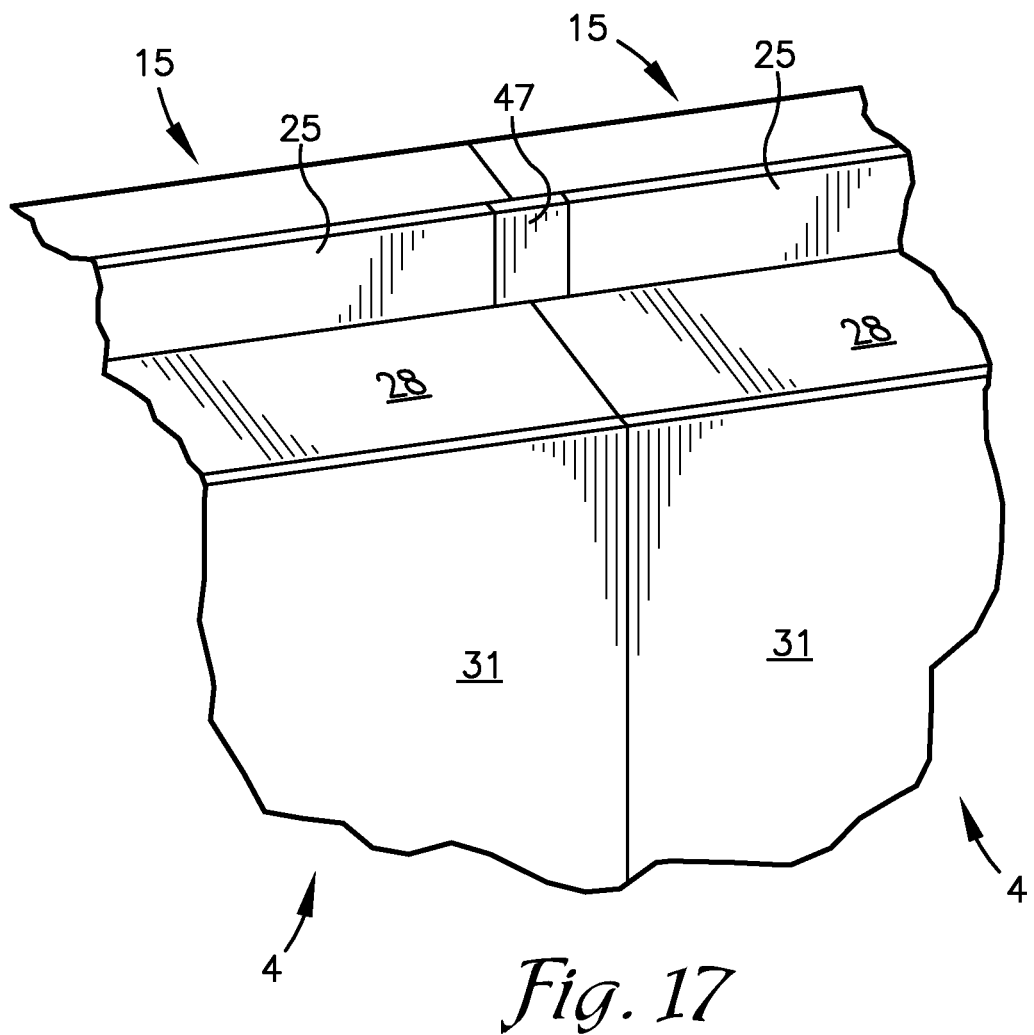
FIG. 17 is an enlarged and fragmentary perspective view showing a joint between two panels of the modular wall panel system.
Figure 18:
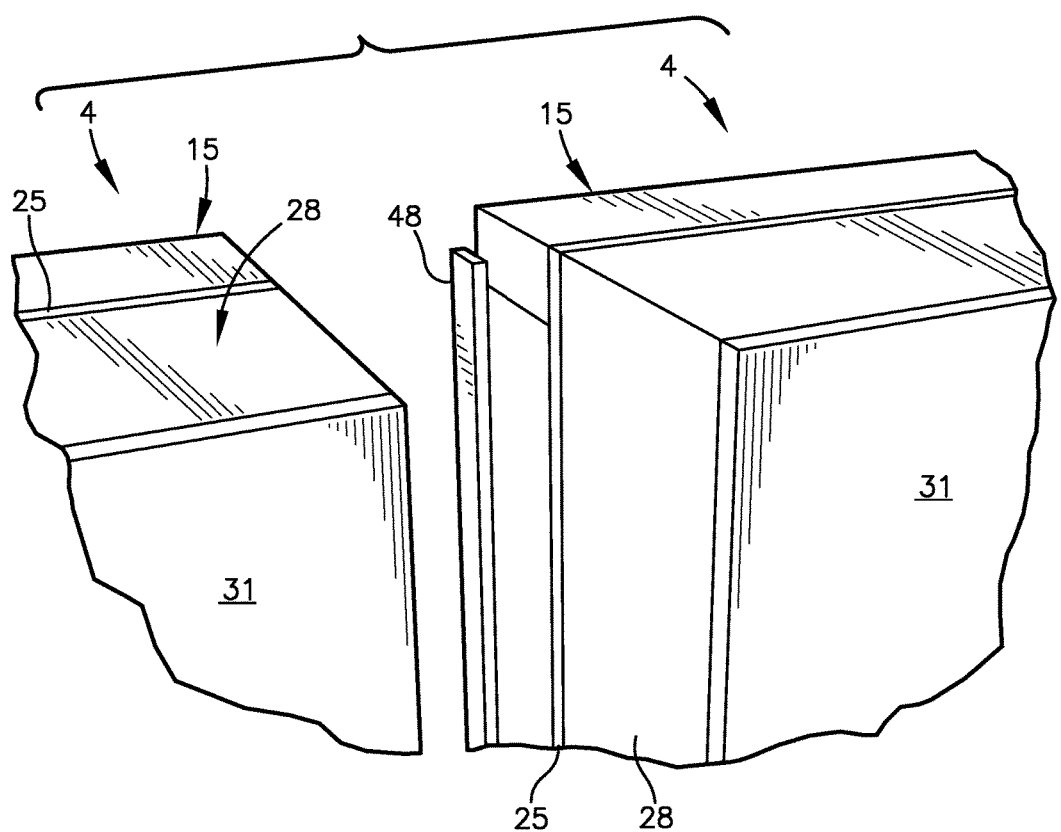
FIG. 18 is a view similar to FIG. 16 showing a butt joint between two panels.

Adjacent panels 4, 5, 6 and 11 may be connected together by a variety of means. As shown in FIGS. 16 and 17, the inner sheathing 25 of each panel 4, 5, 6 and 11 may be sized narrower than the structural frame 15, insulation layer 28 and exterior sheathing 31 so that a groove or channel 45 extends vertically along each side of the panels 4, 5, 6 and 11. A spline 47, twice as wide as the grooves 45, may then be positioned in aligned grooves 45 of adjacent panels 4, 5, 6 or 11 for joining the panels 4, 5, 6 or 11 together. A sealant (not shown) may be applied in the grooves 45 to prevent air or water penetration around the joint. Abutting studs 19 of adjacent panels 4, 5, 6 or 11 may be secured together using wood screws driven horizontally therethrough. Alternatively, and as shown in FIG. 18, panels 4, 5, 6 and 11 may be formed without the channels 45 and simply butted together with a layer of expandable foam tape 48, or other sealant, applied between adjacent studs 19 of the panels 4, 5, 6 or 11 with wood screws driven through the abutting studs 19 to secure the panels 4, 5, 6 or 11 together.

FIG. 19 shows a J-shaped, insulating foundation form or J-form 51 used in forming a slab foundation 52 and to provide an insulating layer between the slab 52 and the ground. J-form 51 may be formed from a foam material. J-form 51 is preferably used in combination with planar insulating panels 53 to form a layer of insulation underneath the entire foundation 52. The J-forms 51 are positioned to form the outer periphery of the foundation and form a slab 52 with a thicker peripheral edge. The planar insulating panels 53 extend between the J-forms 51 and have a uniform thickness which may be approximately four inches or thicker.

The J-form 51 includes an exterior wall 55, a bottom 57 and an inner wall or lip 59. Exterior wall 55 projects upward from the bottom 57 along an exterior edge thereof and is rectangular in cross-section. The thickness of the exterior wall 55 preferably matches the thickness of insulating layer 28 and exterior sheathing 31 of the panels 4, 5, 6 and 11. The inner lip 59 extends upward from the bottom 57 along an inner edge thereof and in spaced relation from the exterior wall 55. Inner lip 59 slopes upward and away from the exterior wall 55 and in the embodiment shown is triangular in cross-section Inner lip 59 is shorter than exterior wall 55 and a trough 61 is formed between the exterior wall 55 and the inner lip 59. An air barrier 63 formed from a sheet of polymeric material such as polyethylene is adhered to the inner and upper surface of the J-form 51.

J-forms 51 and planar insulating panels 53 are preferably laid in place on top of a layer of compacted stone 64 shaped so that the upper surface of the planar insulating panels 53 extend horizontally and generally flush with an upper edge of the inner lip 59 of the J-forms 51. In the embodiment shown, a shoulder 65 projects outward from lip 59 a distance below the upper edge of the lip 59 corresponding to the thickness of a planar insulating panel 53. The shoulder 65 supports the edges of the insulating panel 53 against sagging as the compacted stone layer 64 settles. Shoulder 65 may be formed from a strip 66 of foam material inserted in a groove 67 formed in and extending the length of the J-form 51.

When all of the J-forms 51 and planar insulating panels 53 are positioned in place, concrete is poured into the J-forms 51 and over the planar insulating panels 53 to fill the trough 61 and extend above the upper surface of the insulating panels 53 a uniform depth which may be approximately four inches or greater. Additional forms (not shown) may be positioned on top of the J-forms so that the concrete may be poured to a depth extending above the top of the J-forms 53. Once the concrete has set and cured, pressure treated lumber may be anchored to the foundation 52 around the periphery thereof to form a sill 68. Bottom panels 18 of panels 4, 5, 6 and 11 may be then be secured to the sills 68 with the insulating layer 28 and exterior sheathing 31 extending over the exterior wall 55 of the J-form 51. An insulating strip 69, which may be formed from expandable foam or liquid sealant, is preferably positioned and secured in the gap between an upper surface of the exterior wall 55 of J-form 51 and a lower edge of the insulating layer 28 and exterior sheathing 31.

It is to be understood that the wall panel system 1 can be used with a wide variety of foundations and is not limited to use with flat slab type foundation formed using the J-form 51. The panels 4, 5, 6 and 11 may be connected to a sill 68 anchored to a foundation wall. In addition, the panels 4, 5, 6 and 11 may be anchored or secured to the sub-floor of different levels of a building.

FIGS. 20-23 are diagrammatic views showing corner panel jigs 80a and 80b for assembling the outer and inner corner panels 11a and 11b respectively. Each jig 80a and 80b includes a jig cradle 81a and 81b and a jig cap 82a and 82b. The jigs 80a and 80b can be used with a standard hydraulic press 83 to press the components together and allow the adhesive securing the insulation layer 28 to the interior sheathing 25 and the exterior sheathing 31 to the insulating layer 28 to set or cure under pressure, bonding the insulation layer 28 to the interior sheathing 25 and exterior sheathing 31.

Figure 21:
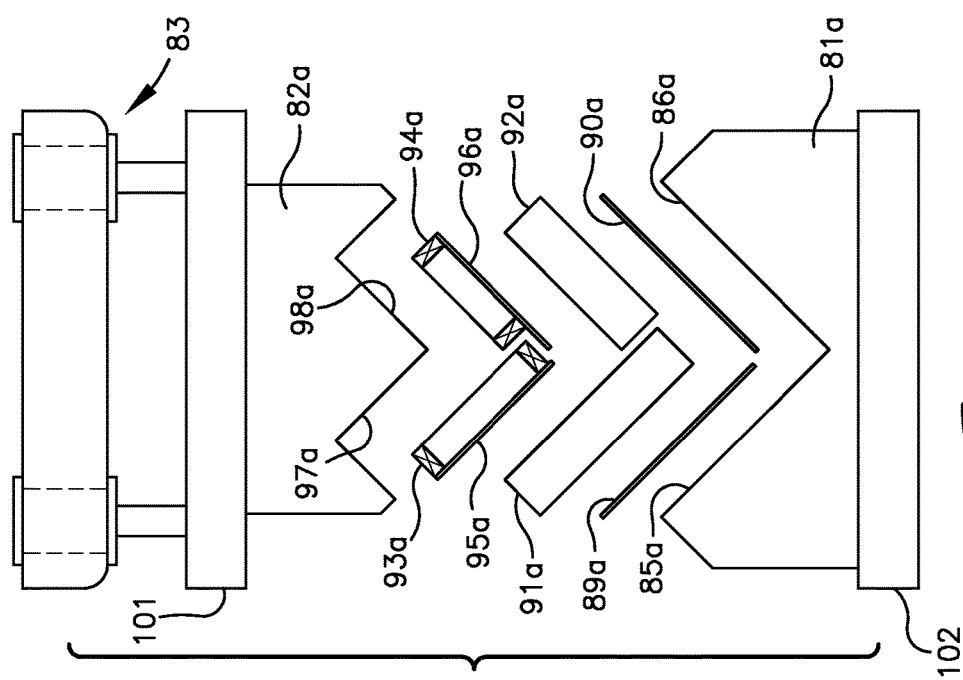
FIG. 21 is an exploded diagrammatic view of the jig as shown in FIG. 20 used to form and secure together components of an outer corner panel which is positioned within a press

Referring to FIGS. 21 and 22, jig cradle 81a includes first and second cradle walls 85a and 86a which are formed to extend perpendicular to each other and slope downward and inward relative to each other to form a trough. First and second panels of exterior sheathing 89a and 90a, sized to form adjacent sides of an outside corner 11a, are positioned against the first and second cradle walls 85a and 86a. First and second panels of insulation 91a and 92a are sized to fit on top of the exterior sheathing panels 89a and 90a respectively. A layer of adhesive is applied to an upper surface of the first and second panels of exterior sheathing 89a and 90a in cradle 81a or on a bottom surface of first and second panels of insulation 91a and 92a or both, prior to positioning insulation panels 91a and 92a on top of exterior sheathing panels 89a and 90a respectively.

First and second frame sections 93a and 94a are constructed from framing members and first and second panels of interior sheathing 95a and 96a are fastened thereto. A layer of adhesive is applied to the bottom or exterior surface of the interior sheathing panels 95a and 96a or to the upper surface of the insulation panels 91a and 92a or both prior to positioning frame sections 93a and 94a with attached sheathing 95a and 96a on top of insulation panels 91a and 92a respectively. Jig cap 82a is then positioned on top of the frame sections 93a and 94a. Jig cap 82a includes first and second cap walls 97a and 98a which extend perpendicular to each other and slope downward and inward toward each other to form a downward projecting v-shaped structure.

The jig cradle 81a and jig cap 82a with exterior sheathing panels 89a and 90a, insulation panels 91a and 92a, frame sections 93a and 94a with attached interior sheathing panels 95a and 96a positioned therebetween are positioned between upper and lower platens 101 and 102 and pressed together while the adhesive between layers at least partially cures. As seen in FIG. 21, the second panel of exterior sheathing 90a is sized wider than the second insulation panel 92a to cover an end of the first insulation panel 91a which overlaps with second insulation panel 92a. Similarly the second panel of interior sheathing 96a is sized wider than the second frame section 94a so that the wider portion of interior sheathing second panel 96a covers an end of the first frame section 93a which overlaps with the second frame section 94a. First insulation panel 91a is also wider than second insulation panel 92a and first frame section 93a is wider than second frame section 94a.

Figure 23:
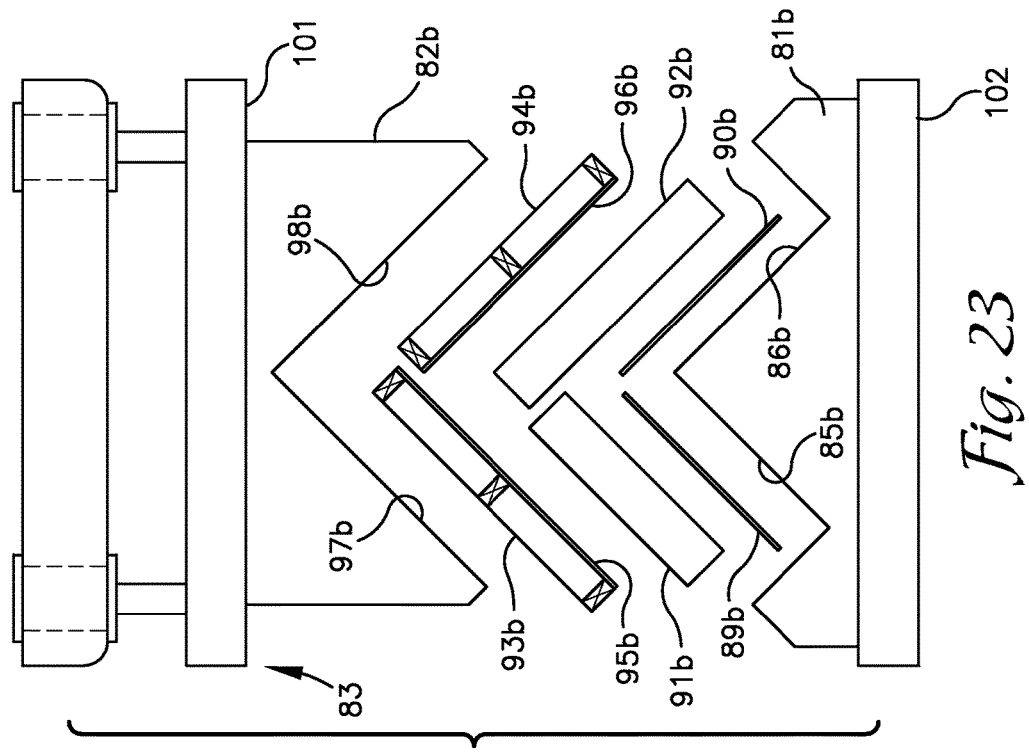
FIG. 23 is a diagrammatic view of the jig as shown in FIG. 22 used to form and secure together components of an inner corner panel which is positioned within a press.

Referring to FIGS. 22 and 23, jig cradle 81b is also constructed with first and second cradle walls 85b and 86b extending perpendicular to each other but sloping downward and outward to form a peaked structure against which first and second panels of exterior sheathing 89b and 90b may be laid in forming a laminated inside corner panel 11b. First and second insulation panels 91b and 92b are positioned on top of the exterior sheathing panels 89b and 90b with a layer of adhesive therebetween and first and second frame sections 93b and 94b with interior sheathing panels 95b and 96b fastened thereto are positioned on top of the insulation panels 91b and 92b with a layer of adhesive therebetween. Jig cap 82b having outwardly and downwardly sloped, perpendicular first and second cap walls 97b and 98b is then positioned over frame sections 93b and 94b. The jig cradle 81b and jig cap 82b with exterior sheathing panels 89b and 90b, insulation panels 91b and 92b, frame sections 93b and 94b with attached interior sheathing panels 95b and 96b positioned therebetween are positioned between upper and lower platens 101 and 102 and pressed together while the adhesive between layers at least partially cures. In them embodiment shown, insulation panel 92b is longer than and overlaps with an end of insulation panel 91b and frame section 93b with attached interior sheathing panel 95b is longer than and overlaps with frame section 94b and attached interior sheathing panel 96b.

Figure 24:
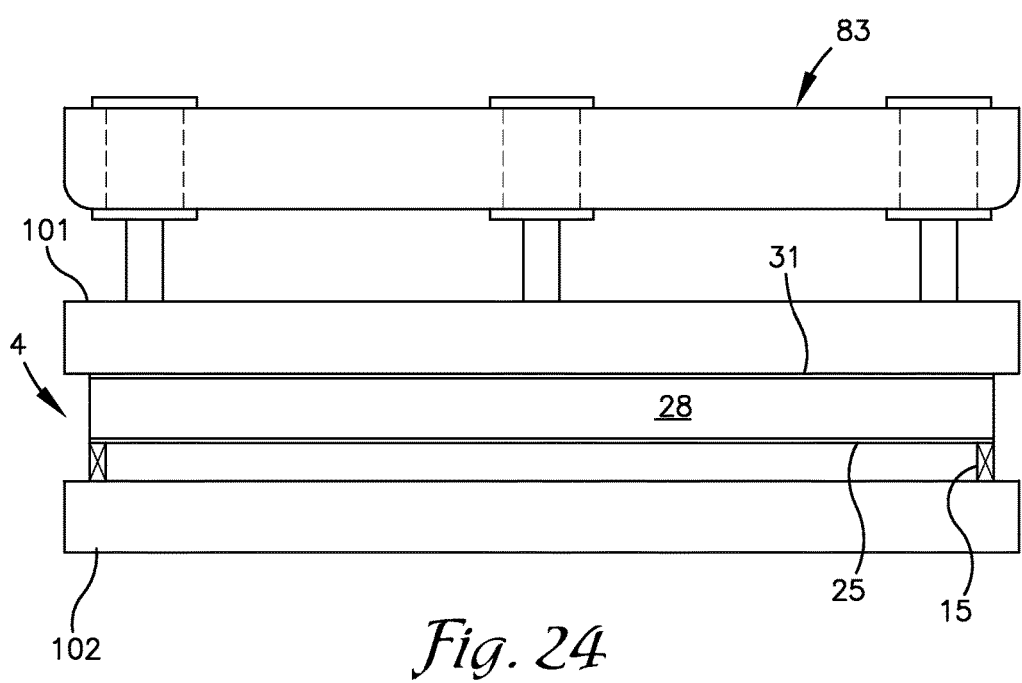
FIG. 24 is a diagrammatic view of a continuous building panel positioned within a press.
Figure 25:
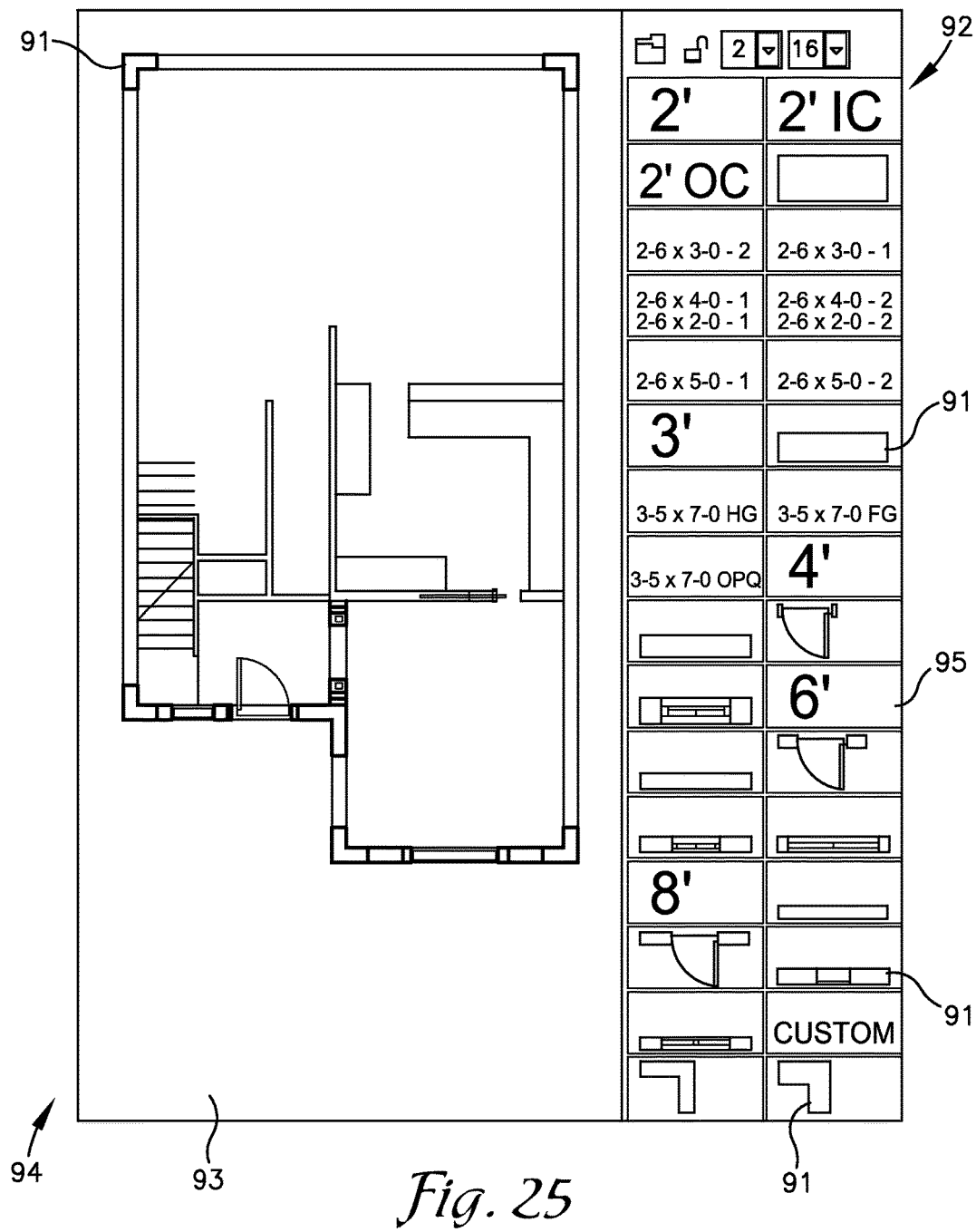
FIG. 25 is a diagrammatic view of a screen computer screen showing the creation of a floor plan in process using graphical representations of the continuous, window, door and corner panels of the wall panel system.
Figure 26:
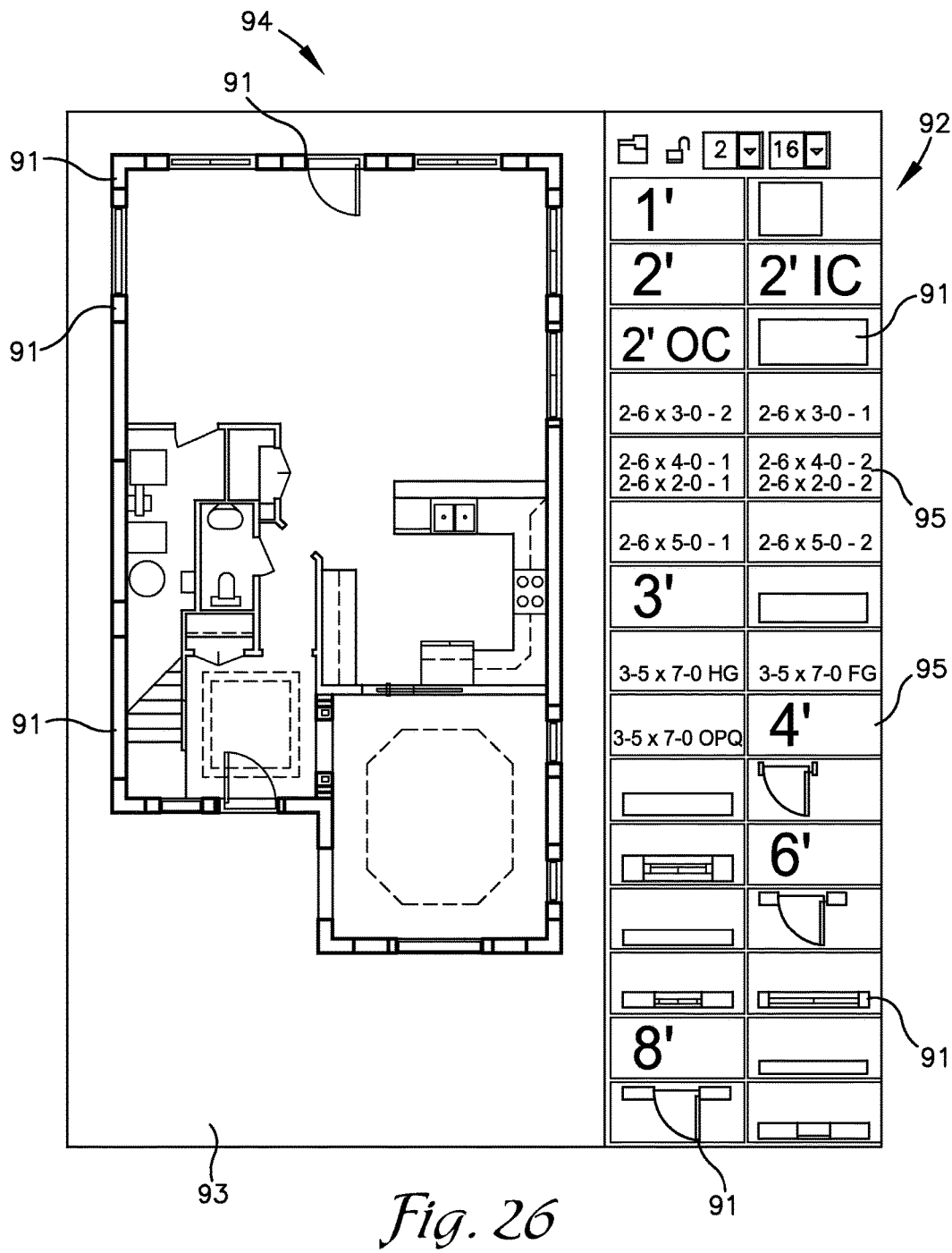
FIG. 26 is a diagrammatic view similar to FIG. 25 showing the floor plan completed.

FIG. 24 is a diagrammatic view of a continuous panel assembly 4 compressed between platens 101 and 102. The continuous panel assembly 4 includes frame 15, inner sheathing 25, insulation layer 28 and exterior sheathing 31. In one embodiment, the inner sheathing 25 is fastened to frame 15 prior to positioning between the platens 101 and 102. A layer of adhesive is applied between the inner sheathing 25 and the insulation layer 28 and another layer of adhesive is applied between the insulation layer is constructed prior to positioning between platens 101 and 102. It is to be understood that a wide variety of presses could be used in forming the panels including panels 4, 5, 6 and 11.

It is foreseen that a wide variety of adhesives could be used for adhering the insulation layer 28 to the inner sheathing 25 and exterior sheathing 31. Examples of adhesives may include polyurethane, silicone, silyl terminated polyether and silyl terminated polyurethane. The panel system 1 is particularly well adapted for use in modular construction of the exterior walls of buildings. A computer design program is preferably utilized to aid an architect or designer in selecting the panels 4, 5, 6 and 11 to be assembled together to construct a proposed design or plan. Referring to FIGS. 22 and 23, the design program preferably allows the designer to drag and drop graphical representations 91 of each panel from a toolbox 92 or the like into position on a grid or work area 93 on a computer screen or display 94. The program may allow the architect or designer to initially create a floor plan in a traditional drawing format or import a previously drawn floor plan into the program and then drag and drop in representations 91 of panels 4, 5, 6 and 11 necessary to assemble the design. The program allows the designer to revise the design if necessary based upon limitations as to the size and type of existing panels and positioning of windows 10 and doors 9. The toolbox 92 also preferably includes labels 95 for each of the graphical representations 91 providing information corresponding to the dimensions of the panel or other information such as whether the corner panel 11 is an outside corner panel 11a or inside corner panel 11b. The program can also be used to select and specify the foundation forms, such as J-forms 51, to be utilized.

FIG. 22 represents a screen shot of a computer screen 94 on which a designer is selecting panels 4, 5, 6 and 7 to create the exterior walls of a floor plan. The designer initially drew the outline of the floor plan and then placed representations 91 of outside and inside corner panels 11a and 11b in the corners of the floor plan. The designer has also added representations of a couple of window panels 6 and a door panel 5 along one side of the floor plan and has added some of the interior detail. FIG. 23 shows the completed floor plan with graphical representations 91 for all of the exterior wall panels 4, 5, 6 and 11 added to the work area to complete the exterior walls. The designer has also filled in additional detail for the floor plan.

In one embodiment of the wall panel system 1 and method of using, the exterior walls will often be designed in even foot increments facilitating use panels 4, 5, 6 and 11 formed in even increments of two, four and eight feet. In such panels 4, 5, 6 and 11, the frames 15 are preferably formed with studs 19 spaced apart in two foot increments. The addition of the insulating layer 28 and exterior sheathing 31 to the frame 15 results in a panel that is generally stronger than a panel formed from a frame 15 and interior sheathing 25 formed with studs 19 on sixteen inch spacing. The one foot panels 4 may be used where necessary and are particularly well adapted for use around door or window panels 5 and 6 to center the panels relative to a wall if necessary.

The program is adapted to inventory the panels incorporated into the design based upon the labels 95 associated with each graphical representation 91. Once the inventory of panels 4, 5, 6 and 11 required to build the proposed design has been prepared using the program, the panels 4, 5, 6 and 11 can be ordered from a supplier to be delivered to the construction site for assembly. The supplier may be the manufacturer or wholesale or retail outlets.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

I claim:

1. A method of forming a building panel comprising:
   constructing a frame from a plurality of framing members;
   fastening an inner layer of sheathing to an outer side of said framing members of said frame;
   adhering a layer of insulation to an outer surface of said inner layer of sheathing without using fasteners;
   adhering an outer layer of sheathing to an outer surface said layer of insulation without using fasteners; said outer layer of sheathing having a water resistive barrier applied thereto.

2. The method as in claim 1 further comprising pressing said frame, the inner layer of sheathing, the layer of insulation and the outer layer of wood sheathing together in a press.

3. The method as in claim 1 wherein said layer of insulation comprises a foam panel.

4. The method as in claim 1 wherein said layer of insulation comprises a layer of rigid mineral wool insulation.

5. The method as in claim 1 wherein said inner and outer layers of sheathing are formed from engineered wood.

6. The method as in claim 1 further comprising:
   constructing the frame to include framing for an opening for a window;
   forming aligned holes in said inner layer of sheathing, said layer of insulation and said outer layer of sheathing sized to hang a window therein; and
   mounting a window in said aligned holes with brackets connecting the window to the frame.

7. The method as in claim 6 wherein the brackets comprise angle clips and each angle clip includes first and second legs extending in perpendicular relationship, a first pair of fastener holes is formed in the first leg of each clip and a second pair of fastener holes is formed in the second leg of each clip, centers of the first pair of fastener holes extend on an axis parallel to a corner formed between the first and second legs and centers of the second pair of fastener holes extend on an axis transverse to the corner, the first leg of each angle clip is fastened to an exterior surface of mounting structure of the window and the second leg of each angle clip is fastened to the interior sheathing.

8. The method as in claim 6 wherein the brackets comprise angle clips and each angle clip includes first and second legs extending in perpendicular relationship, a first pair of fastener holes is formed in the first leg of each clip and a second pair of fastener holes is formed in the second leg of each clip, the first pair of fastener holes extend in spaced relation across a width of the first leg and second pair of fastener holes extend in spaced relation lengthwise relative to the second leg, the first leg of each angle clip is fastened to an exterior surface of mounting structure of the window and the second leg of each angle clip is fastened to the interior sheathing.

9. The method as in claim 1 further comprising:
   constructing the frame to include framing for an opening for a door;
   forming aligned holes in said inner layer of sheathing, said layer of insulation and said outer layer of sheathing sized to hang a door therein; and
   hanging a door in the opening for the door in the frame.

* * * * *